United States Patent [19]

Walker

[11] 3,872,003
[45] Mar. 18, 1975

[54] HIGH-OXYGEN TREATMENT OF WASTE WITH SELECTIVE OXYGEN RECIRCULATION

[75] Inventor: James Donald Walker, Aurora, Ill.

[73] Assignee: Chicago Bridge & Iron Company, Aurora, Ill.

[22] Filed: Sept. 20, 1972

[21] Appl. No.: 290,627

[52] U.S. Cl.............. 210/63, 210/8, 210/14, 210/15, 210/96, 210/195, 210/199, 210/220
[51] Int. Cl......... C02b 3/08, C02c 1/10, C02c 5/04
[58] Field of Search .......... 210/14, 15, 63, 96, 194, 210/195, 220, 221, 3–8, 199, 205

[56] References Cited
UNITED STATES PATENTS

| | | | |
|---|---|---|---|
| 2,638,444 | 5/1953 | Kappe | 210/14 X |
| 3,271,304 | 9/1966 | Valdespino et al. | 210/14 X |
| 3,347,537 | 10/1967 | Morgan | 210/14 X |
| 3,547,811 | 12/1970 | McWhirter | 210/15 X |
| 3,547,812 | 12/1970 | McWhirter | 210/15 X |
| 3,547,815 | 12/1970 | McWhirter | 210/15 X |
| 3,557,954 | 1/1971 | Welch | 210/96 X |
| 3,775,307 | 11/1973 | McWhirter et al. | 210/220 X |

Primary Examiner—Charles N. Hart
Assistant Examiner—Robert H. Spitzer
Attorney, Agent, or Firm—Darbo, Robertson & Vandenburgh

[57] ABSTRACT

Gas higher in oxygen content than is air is used efficiently for the treatment of waste liquid by selectively repumping and reintroducing gas which bubbles up from the surface of the contents of an oxygenation tank in the area where the larger bubbles escape, this being over the area of introduction. This gas is substantially isolated from the gas which breaks the surface in more remote areas and which is from finer bubbles more nearly exhausted of their oxygen. Oxygen from a source of nearly pure oxygen is constantly added to the repumped gas. The quantity of this enrichment preferably is determined automatically, in response to a meter determining the dissolved oxygen content in the tank liquid, to supply just the amount needed to maintain a desired dissolved oxygen content. In some forms of the invention the waste liquid to be treated flows through successive isolated or semi-isloated cells, and the regulation of oxygen enrichment supplied to each cell is automatically regulated to provide the desired oxygen content of that cell.

11 Claims, 2 Drawing Figures

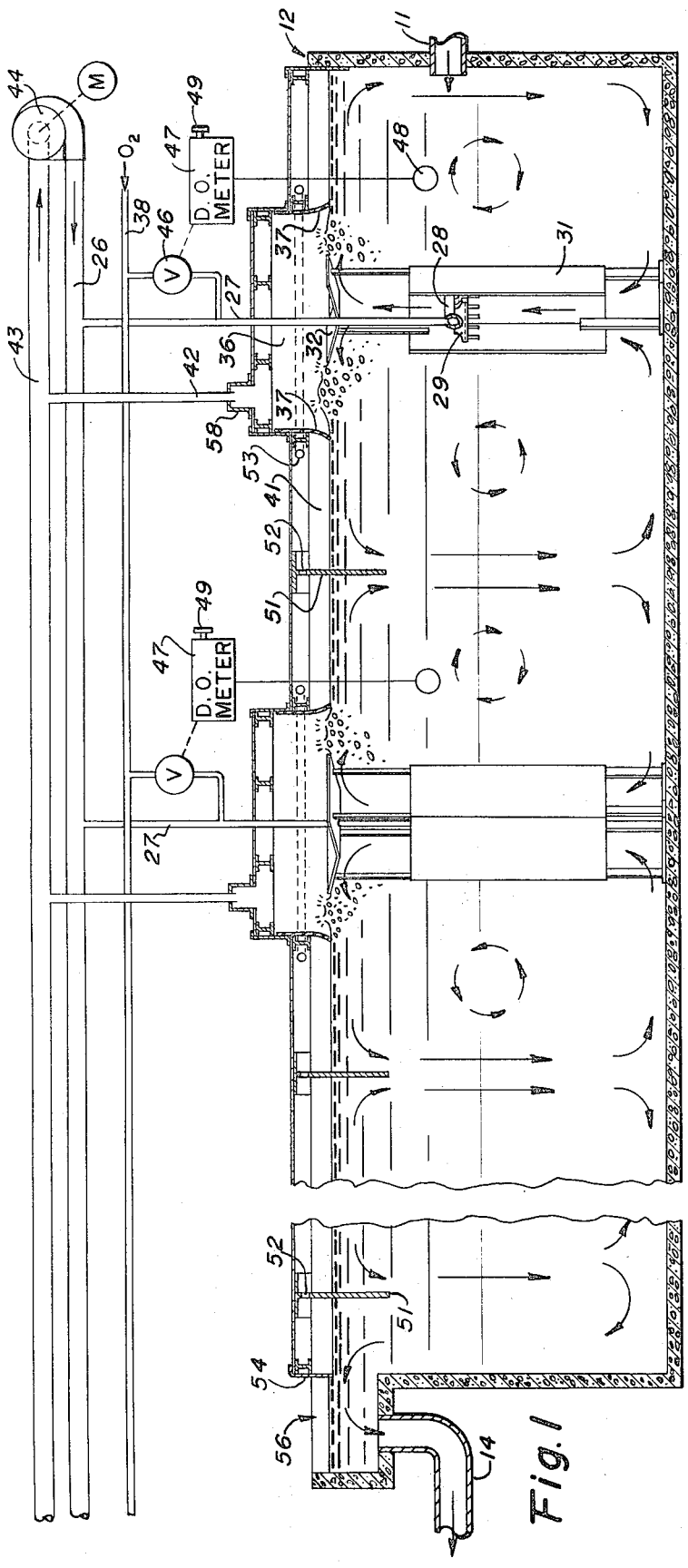
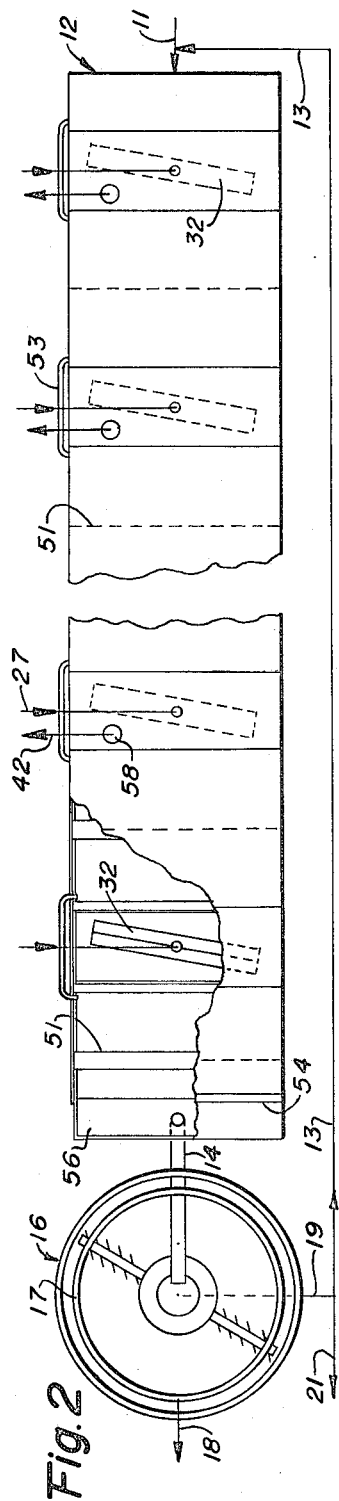

HIGH-OXYGEN TREATMENT OF WASTE WITH SELECTIVE OXYGEN RECIRCULATION

INTRODUCTION

The invention of which the present disclosure is offered for public dissemination in the event that adequate patent protection is available relates to the treatment of sewage and other liquid waste, particularly to treatment typified by the famous activated sludge process.

There has long been recognition that in such oxygenation processes of liquid waste, the use of relatively pure oxygen or of air enriched with added oxygen would have advantages. This is fundamentally due to the fact that the rate and attainable level of dissolution of oxygen in water increase as the oxygen content of the gas to which the water is exposed increases.

An example of the beneficial results is indicated by recent experimental experience with a sewage treatment plant for a small city, where the increased sewage volume had so overloaded the plant that it virtually was not functioning. By adding oxygen to the air, enclosing the oxygenation tank so that the high-oxygen gas could be recirculated, treatment so improved that the plant ceased to be overloaded. Not only did the aeration tank function properly with a loading factor substantially as before and far beyond the design loading, but also the final settler or clarifier was able to function properly in spite of having this unexpected volume passing through it. The quality of the effluent was as good as could have been expected with only normal loading, the solids settling with unusual rapidity and producing an unusually dense sludge which facilitated the return of adequate quantity of activated sludge solids. It would also facilitate digestion of the waste-activated sludge. These good results have not yet been constant, but are expected to become so.

The chief deterrent to the use of oxygen enrichment in waste treatment has been the high cost of oxygen. However, prior to the present invention there has been recognition that economic factors have changed to the point where the use of nearly pure oxygen should be considered even in instances where the situation was not so desperate as that just recounted. Not only has the cost of nearly pure oxygen become relatively more reasonable, but also the cost of sewage plant construction, and the scarcity of available ground space for sewage plants, have indicated the need for the higher loadings which are permitted by a high-oxygen treatment.

It is nevertheless important to use the oxygen efficiently and economically. For example, in the experiments recounted above, the consumption of oxygen may have been high enough so that in ordinary situations it would have been definitely a discouraging factor.

One system of high-oxygen treatment proposed in a publication of the U.S. Government has reportedly achieved the use of about 90% of the oxygen. This would seem to be relatively efficient use of the oxygen. However, this 90% use has been achieved by using the oxygen in successive cells so that the oxygen content became more and more depleted at each stage. This may be satisfactory when the successive decreases in enrichment happen to match well the successive decreases in need presented by the sewage being treated. It would, however, be completely unsuited for some of the modern methods of treatment such as "complete mix" in which the oxygen need throughout the aeration tank is substantially uniform. Even when the method of treatment is one which is intended to be suitable for this "hand-me-down" progression of gas from cell to cell, this system might be unable to accommodate itself to changes in character or volume of the sewage. In addition, there is a danger that not only will the oxygen content be reduced but the carbon dioxide content may be so increased as to cause an acidifying of the sewage thereby preventing nitrification.

According to the present invention, a system is provided which includes selective recirculation of high-oxygen gas, i.e., gas which is at least higher than air in oxygen content. This is achieved in a tank the contents of which are set in rolling motion by gas-lift action of deeply submerged gas liberation, with the gas-lifted liquid forming a stream flowing horizontally with its surface exposed whereby large bubbles escape quickly and fine bubbles are carried to remote parts of the tank. According to this invention this type of system is utilized by substantially isolating the portion of the surface of the tank over or nearly over each area of liberation of such gas deeply submerged in the tank, so that the gas which escapes relatively quickly in large bubbles can be isolated from the gas which is in the form of tiny bubbles which are entrained in the rolling tank contents and only reach the surface after a long average contact time with the liquid. The quickly released, high-oxygen gas which is thus relatively isolated is the gas which is recirculated, being drawn to the circulating pump, recompressed, enriched with more high-oxygen gas, and liberated at the deeply submerged points in the tank.

Preferably the constant enrichment of the circulating gas by nearly pure oxygen is regulated automatically but with the aid of dissolved oxygen metering, i.e., constant determination of dissolved oxygen content. If the tank is a complete-mix tank, with high uniformity throughout the tank, a single dissolved oxygen meter can regulate the enrichment of oxygen for all points of liberation. With other tank systems, and especially with an end-to-end flow which tends to be necessary for the "hand-me-down" system described, it is preferred that each area of gas liberation have its separate enrichment control responsive to a dissolved oxygen meter in its immediate vicinity.

Additional advantages and objects of the invention will be apparent from the following description and from the drawings.

DESIGNATION OF FIGURES

FIG. 1 is a largely diagrammatic view, representing a longitudinal vertical section through a treatment tank using the present invention, and FIG. 2 is a still more highly diagrammatic plan view representing the tank of FIG. 1 and also a settling tank and the return of activated sludge to the feed end of the treatment tank.

BACKGROUND DESCRIPTION

The present invention may be used with any general type of sewage treatment system with which aeration would have been used heretofore. The various systems which have been common in recent years may be classified as varieties of the activated sludge process. FIG. 2 represents such a process diagrammatically. The sewage to be treated enters the activated sludge section of the tank by an inflow line 11. Usually this sewage will have been subjected to screening and primary settling before reaching this point.

The main unit of an activated sludge system is an oxygenation tank 12 which heretofore has been more commonly called an aeration tank. Within the tank 12 the sewage is mixed with return activated sludge from return line 13, and the entire contents of the tank are kept in motion and continuously mixed with an oxygen-bearing gas. In the past the oxygen-bearing gas has virtually always been air. Oxygen from the gas or air is dissolved in the "mixed liquors." A constant replenishment of the dissolved oxygen is necessary inasmuch as the biochemical process by which the sewage is treated constantly consumes oxygen.

The outflow 14 from the oxygenation tank 12 leads to a final settling tank 16. In this tank clear water overflows into a trough 17 and its outflow 18 is the effluent of the activated sludge system. The solids settle to the tank floor from which they are drawn off through a sludge line 19. Typically of the activated sludge systems, this sludge is activated sludge, being rich in the organisms necessary for rapid treatment of the incoming sewage, and most of this sludge is returned directly or indirectly to the tank 12 as indicated by the line 13 in FIG. 2. The sludge not needed to keep the process going efficiently is wasted as indicated by line 21. The waste activated sludge is commonly treated further, as in a digester or sludge burner. The effluent through line 18 may also be treated further, as by chlorination or tertiary treatment.

When an activated sludge system is operating properly, the effluent at 18 is so nearly free of solids as to appear clear. In the past its discharge to a stream has been considered entirely suitable.

The present invention may desirably be used with all variations of the activated sludge process. These have included conventional activated sludge, contact stabilization, complete mix, step feed, extended aeration, modified aeration and plug flow. In any of these the tank may be spiral flow, cross flow, ridge and furrow, swirl mix, etc. There has been an almost endless variety of kinds of apparatus for diffusion of the air or oxygen-bearing gas. For many years the standard diffusion was to discharge air through porous tubes or plates deep in the tank, the air rising by buoyancy to stir and oxygenate the contents of the tank.

FIG. 2 illustrates, in addition to novel features of the present invention, a more modern system of utilizing the oxygen-bearing gas for stirring and oxygenating the tank. One of the purposes of this invention is to be able to use this advantageous system with high-oxygen gas. According to this system the gas, heretofore air, has been supplied through a main 26 and branch supply pipes 27 to headers 28 carrying numerous multiple spargers 29 to release gas uniformly throughout the horizontal cross section of huge horizontally-elongate draft tubes or eductor tubes 31. These functioned as a sort of gas-lift pump, each producing a vigorous upwardly flowing stream. Water was drawn from the bottom of the tank, and an air and gas mixture issued from the top of eductor tubes 31. Energy-recovery baffles 32 are, except for possibilities noted below, desirable to deflect the rising stream laterally, for greatest efficiency in high speed horizontal movement of the liquid and smaller entrained bubbles away from the baffle 32. Very fine bubbles were carried throughout the tank.

Although the following disclosure offered for public dissemination in detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

DESCRIPTION OF THE PRESENT INVENTION

The present invention is concerned with making efficient use of substantially pure oxygen. There has been recognition heretofore that treatment using nearly pure oxygen had important advantages. If the gas liberated in the contents of the tank has a higher content of oxygen than air, the oxygen is dissolved more rapidly, and it becomes practical to maintain a substantially higher level of dissolved oxygen than is practical when using air. This in turn produces more rapid treatment, and also produces a sludge which settles better in clarifier 16. A tank 12 of a given size followed by a clarifier 16 of a given size can both successfully and reliably handle a great deal more sewage when the gas introduced is high-oxygen gas, gas having substantially more oxygen than does air. Furthermore the system effluent through line 18 tends to be more clear, and the sludge drawn at line 19 tends to be more dense. With the more dense solids, the required amount of return activated solids can be returned with less total volume, and the waste activated sludge volume through line 21 is reduced so that following treatment units do not need to be as large as would otherwise be required.

There has been previous recognition that by covering a tank to which nearly pure oxygen was being supplied, the oxygen-rich gas escaping at the surface could be drawn off to a pump, recompressed and reintroduced in the tank.

According to the present invention, there is selectivity in drawing off the high-oxygen gas to be recirculated. Thus a chamber 36 is provided over the area of prompt and copious eruption which in the present instance means over the region of and somewhat beyond the eductor tubes 31. The chamber 36 is separated from the more remote spaces above the tank contents, as by flexible skirts 37. Substantially all of the large bubbles of gas in the stream rising from eductor tube 31 will escape in the chamber 36. Now when nearly pure oxygen from a supply pipe 38 supplies high-oxygen gas to header 28 these large bubbles which escape into chamber 36 will be high-oxygen bubbles because there will not have been much opportunity for the oxygen content of these large bubbles to have been dissolved in the contents of the tank. However the smaller bubbles, which remain entrained in the tank contents and flow under skirts 37 will have relatively more of their oxygen dissolved in the mixed liquors. Indeed some of these bubbles will be quite tiny bubbles and will remain entrained in the rolling body of liquid so that they will be carried down to the bottom of the tank, and some will even tend to remain rolling around and around near the core of the huge roll which tends to be set up by the draft tube action. Of course, all the bubbles within the rolling body tend to rise. It is inevitable that some of them escape beyond the curtains 37.

Although this space beyond the curtains 37 can be opened to the atmosphere, some engineers may prefer to enclose it thus forming chambers 41. Whether these bubbles escape to the atmosphere or to chamber 41, they can be expected on the average to have a considerably lower oxygen content, percentagewise, than the bubbles which escape into chamber 36. Not only will they have been exposed to the dissolving of the oxygen for a longer time, but because they are smaller bubbles they will have a larger ratio of surface to volume. Due to these two factors, the oxygen content of the gas escaping beyond skirts 37 will be very much lower than that escaping in chamber 36.

The high-oxygen gas escaping in chamber 36 will be drawn through return pipe 42 to main 43 and back to compressor 44 which will compress this high-oxygen gas and discharge it into main 26. Accordingly, a relatively small amount of nearly pure oxygen from source pipe 38 can be added to the already high-oxygen gas carried by main 26 and riser 27 to restore its oxygen content to that which is desired for liberation through spargers 29.

In most instances it will be preferred to regulate the flow of enriching oxygen to several sections of tank 12 separately. Thus each branch 27 may be connected to oxygen supply pipe 38 through a separate modulating valve 46. It is highly desirable that each valve be more or less constantly adjusted according to the changing needs of the particular section of tank 12 to which it leads. To this end, a dissolved oxygen meter 47 is provided for each valve, this meter having a sensing device 48 in the tank contents. Preferably each meter 47 has a knob 49 for adjusting the level of dissolved oxygen at which it calls for increased supply of oxygen through valve 46. For oxygen economy, it may be found desirable to maintain different levels of dissolved oxygen in different parts of tank 12. For example, if tank 12 is of the "plug flow" type in which to a large extent a given mass of mixed liquors move somewhat steadily and progressively from the feed end of the tank to the outflow end of the tank, it may be desired to maintain a very high level of dissolved oxygen in the first section to get the treatment of the sewage off to as rapid a start as possible. Also, at the final section of the tank, a high level of dissolved oxygen may be desirable so that in spite of oxygen consumption during the time in the clarification tank 16, the sludge withdrawn at line 19 will still be well supplied with oxygen. A lower level at intervening sections of the tank may be found to be adequate. Even this lower level may vary from section to section. It should be understood that these oxygenation tanks are usually quite long and it would not be unusual for one to be divided into ten sections.

When flow through a tank is planned to be of the plug flow type, it is preferred to provide baffles 51 extending down into the tank contents to deflect the two streams approaching the baffle from opposite directions into downwardly moving streams with minimum intermixing of the two streams. It may be found that a foot is a sufficient depth for the baffles to extend down into the tank contents, but at present it is preferred that they extend about 3 feet.

If the chosen tank system is that known as complete mix, in which the contents of the tank are nearly uniform throughout, it may be found sufficient to have a single dissolved oxygen meter and to have the valve connected between the supply pipe 38 and the main 26.

Automatic regulation of the supply of oxygen for enrichment is in any event highly important, at least in the usual treatment plant where the inflow is varied both as to quantity and as to quality. The automatic regulation of the enrichment by oxygen, in response to the dissolved oxygen content of the mixed liquors, maintains optimum treatment conditions with no more supply of oxygen than is necessitated by the particular system.

It is desirable that the chambers 36 be yieldably sealed. Normally there should be no opening through which oxygen may drift into chamber 41 to equalize partial pressures, but gauge pressure should not get too far from atmospheric pressure. Because chambers 41 are expected to have an oxygen content somewhat higher than that of air, any small leakage into chamber 36 when more gas is needed there would not be too harmful.

The skirts 37 are preferably moderately flexible so that the outwardly flowing liquor from the deflector baffle 32 will deflect the skirts 37 and these skirts will largely ride the surface of the liquid. Thus they will have a minimum impedance of the desirable rolling action of the contents of the tank, while adequately substantially-isolating or yieldably-sealing the chamber 36 from the space beyond the skirts 37.

If the surface beyond the skirts 37 is covered as illustrated, it is preferable that some yieldable means for escape of gas from them be provided. If venting is to the atmosphere, it may desirably be through connecting passages or conduits 53 and ultimately under a water seal curtain 54 to maintain a pressure in the chambers 41 slightly above that of the atmosphere. Any baffles 51 may be provided with gas passages 52.

If it is considered undesirable for bubbles to be entrained in the flow through the outflow pipe 18, a de-bubbling section 56 can be provided. Surface flow into this section from the eductor tube nearest it is preferably prevented by baffle 51, whether or not provided elsewhere. In de-bubbling sections 56 the liquors are slow enough in movement and shallow enough so that the bubbles have time to rise to the surface. This section can be open to the atmosphere even if closed chambers 41 are provided. The chief advantage of the enclosed chambers 41 is in maintaining a high-oxygen atmosphere in contact with the agitated surface of the tank contents. But in section 56 the surface is calm enough so that there would not be much oxygen transfer anyway, and furthermore the bubbles expected to escape there may have in them very little more oxygen than does air, and in theory they could have even less.

In the expression "substantially pure oxygen" the word substantially is used in a broad sense. There is no need to avoid a fairly high degree of dilution. If the dilution is several percent more than would be tolerated for some uses of nominally pure oxygen, or commercially pure oxygen, the only harm is that a little greater flow of the source gas will be required. It would be entirely possible that an oxygen source in which the oxygen content was even as low as 90% would be economically more advantageous than a higher percentage at higher cost. If the volume of enriching gas provides an excess in chamber 36, i.e., if it exceeds the total of the volume of gas dissolved and the volume escaping into chambers 41, this excess will merely leak out under skirts 37. Ideally, however, the skirts 37 should be located at such a distance from the deflecting baffles 32 that at maximum BOD loading, and hence maximum flow of gas through valves 46, just enough gas would be trapped in chambers 36 to supply the recirculation desired. If the skirts 37 are more remote from baffles 32 than this, chamber 36 entraps more than necessary of the less rich gas, and hence the oxygen content within the chamber 36 (which is drawn for recirculation) will not be quite as high. If skirts 37 are too close, there are two alternatives. If gas may be drawn in from chambers 41, it will undesirably dilute the gas in chamber 36. If, instead, the pressure in chamber 36 is reduced, this is undesirable at full demand because maximum pumping is desired at this time, even though reduced pumping is a desirable economy at lower loadings or demand.

The chambers 36 are preferably high enough to substantially avoid splashing of its roof structure by the relatively violent eruptions just outside of baffles 32. For economy, the remainder of the tank walls are as low as is conventional practice. It is not essential that chambers 36 be so high, at least not if a gas dome 58 is provided which will avoid the entrainment of liquid in the recirculated gases. All interior surfaces should be non-oxidizing.

An important advantage of the present invention over some other attempts to economize on the use of substantially pure oxygen is that there is no progressive build-up from one portion of the tank to the next in the percentage of carbon dioxide present in the gas. If the gas flow is from section to section, a "hand-me-down" system, it tends to pick up carbon dioxide at each section. In the later sections the carbon dioxide content may be high enough to be detrimental as by acidifying the tank contents and impeding nitrification. Nevertheless, if this type of system is to be used, and if there is an area of prompt and copious eruption, the system will be improved by the selective bubble entrapment of the present invention. The gas thus passed along to the next section will be richer in oxygen, and there will probably be less accumulation of carbon dioxide.

No attempt is made to conform to scale in the drawings. However, a very deep tank, such as 25 feet, is contemplated as the illustrated form, the primary orifices of the spargers 29 being, deeply submerged perhaps 10 to 12 feet, to stir the tank contents and have sufficient rise time for a considerable amount of oxygen absorption. Each eductor tube 31 would set up two huge rolls of the tank contents, rotating in opposite directions and each extending a very substantial distance horizontally or in a direction perpendicular to the long horizontal dimension of eductor tubes 31. A relatively small number of eductor tubes thus keeps the entire tank contents in circulation, and sweeps the entire floor, except of course in the de-bubbling section 56.

Although each branch 27 has been shown leading to a single header, there will often be several headers, perhaps each having its own riser, supplied by one branch. Usually there will be one control valve 46 for each relatively uniformly mixed tank area, no matter how many headers or risers.

Tests should be made both with and without baffles 32. Omitting them is expected to result in a higher oxygen content in the return gases. This is preferred unless less dissolved oxygen results.

ACHIEVEMENT

By selectively returning to the pump for recirculation the large bubbles which erupt in the vicinity of the surface directly over the introduction of the high-oxygen gas, the escaping gas which is richest in oxygen is all recirculated. Accordingly only a minimum amount of substantially pure oxygen is required for maintaining the desired high-oxygen content. By constantly regulating the enrichment in response to the dissolved oxygen content of the tank section to which the oxygen is being supplied, the oxygen content is kept to a minimum which will achieve the desired results.

I claim:

1. The method of treating waste liquid with gas richer than air in oxygen which includes flowing the waste liquid through a retention tank, maintaining a gas-lift rolling action of the tank contents with the gas-lifted contents forming a horizontal stream flowing away from the gas-lift zone in surface-exposed position by liberating and allowing to rise immediately by buoyancy said gas at submerged locations along selected zones of the tank comprising a small portion of its total horizontal cross section in sufficient quantities to create and maintain said rolling action and thereby cause said contents to carry small entrained bubbles to remote areas, characterized by:

selectively entrapping gas escaping the liquid in the area over said zones where relatively large gas-lift bubbles quickly escape the liquid forming said horizontal stream, and recirculating and enriching said gas by adding substantially pure oxygen to it, compressing it and liberating it again in the same locations, while substantially excluding from the recirculated gas a significant portion of the gas liberated, namely, such gas from smaller bubbles as escapes the liquid at remote areas beyond the area of selective entrapment.

2. The method of treating waste liquid with gas richer than air in oxygen which includes flowing the waste liquid through a retention tank, maintaining a gas-lift rolling action of the tank contents with the gas-lifted contents forming a horizontal stream flowing away from the gas-lift zone in surface-exposed position by liberating and allowing to rise immediately by buoyancy said gas at submerged locations along selected zones of the tank comprising a small portion of its total horizontal cross section in sufficient quantities to create and maintain said rolling action and thereby cause said contents to carry small entrained bubbles to remote areas, characterized by:

selectively entrapping gas escaping the liquid in the area over said zones where relatively large gas-lift bubbles quickly escape the liquid forming said horizontal stream, and recirculating and enriching said gas by adding substantially pure oxygen to it, compressing it and liberating it again in the same locations, while substantially excluding from the recirculated gas a significant portion of the gas liberated, namely, such gas from smaller bubbles as escapes the liquid at remote areas beyond the area of selective entrapment;

the liberation of gas being through coarse-bubble orifice devices in an eductor tube extending substantially below them to draw tank contents from near the tank floor.

3. The method of treating waste liquid with gas richer than air in oxygen which includes flowing the waste liquid through a retention tank, maintaining a gas-lift rolling action of the tank contents with the gas-lifted contents forming a horizontal stream flowing away from the gas-lift zone in surface-exposed position by liberating and allowing to rise immediately by buoyancy said gas at submerged locations along selected zones of the tank comprising a small portion of its total horizontal cross section in sufficient quantities to create and maintain said rolling action and thereby cause said contents to carry small entrained bubbles to remote areas, characterized by:

selectively entrapping gas escaping the liquid in the area over said zones where relatively large gas-lift bubbles quickly escape the liquid forming said horizontal stream, and recirculating and enriching said gas by adding substantially pure oxygen to it, compressing it and liberating it again in the same locations, while substantially excluding from the recirculated gas a significant portion of the gas liberated, namely, such gas from smaller bubbles as escapes the liquid at remote areas beyond the area of selective entrapment; and automatically regulating the addition of oxygen to said recirculating gas in response to means measuring the dissolved oxygen content of the liquid, to maintain substantially a predetermined dissolved oxygen content in the liquid.

4. The method of treating waste liquid with gas richer than air in oxygen which includes flowing the waste liquid through a retention tank, maintaining a gas-lift rolling action of the tank contents with the gas-lifted contents forming a horizontal stream flowing away from the gas-lift zone in surface-exposed position by liberating and allowing to rise immediately by buoyancy said gas at submerged locations along selected zones of the tank comprising a small portion of its total horizontal cross section in sufficient quantities to create and maintain said rolling action and thereby cause said contents to carry small entrained bubbles to remote areas, characterized by:

selectively entrapping gas escaping the liquid in the area over said zones where relatively large gas-lift bubbles quickly escape the liquid forming said horizontal stream, and further using said gas, while substantially excluding from the further-used gas a significant portion of the gas liberated, namely, such gas from smaller bubbles as escapes the liquid at remote areas beyond the area of selective entrapment.

5. The method of treating waste liquid with gas richer than air in oxygen which includes flowing the waste liquid through a retention tank, maintaining a gas-lift rolling action of the tank contents with the gas-lifted contents forming a horizontal stream flowing away from the gas-lift zone in surface exposed position by liberating and allowing to rise immediately by buoyancy said gas at submerged locations along selected areas of the tank comprising a small portion of its total horizontal cross section in sufficient quantities to create and maintain said rolling action and thereby cause said contents to carry small entrained bubbles to remote areas, characterized by:

selectively entrapping gas escaping the liquid in the area over said zones where relatively large gas-lift bubbles quickly escape the liquid forming said horizontal stream, and further utilizing said gas while substantially excluding from the further-used gas a significant portion of the gas liberated, namely, such gas from smaller bubbles as escapes the liquid at remote areas beyond the area of selective entrapment.

6. Apparatus for treating waste liquid with gas richer than air in oxygen which includes a retention tank, a source of substantially pure oxygen, means for releasing gas including gas from said source at submerged locations along selected zones of the tank, which comprises a small portion of its total horizontal cross section, at positions from which the gas can rise immediately by buoyancy with gas-lift action, and in sufficient quantities to create rolling action of the tank contents with the gas-lifted contents immediately forming a horizontal stream having its surface exposed to release large bubbles while carrying small entrained bubbles to remote areas, characterized by:

a cover over said zones largely segregating areas where large bubbles escape the stream from more remote areas, selectively entrapping gas escaping the liquid in said areas of large-bubble escape, said apparatus being substantially free of impediment to the rolling action through the region of gas lifting and outward therefrom to beyond the area segregated by said cover, means for drawing off the entrapped gas and recirculating and enriching said gas by adding substantially pure oxygen from said source to it, compressing it and liberating it again in the same locations, while substantially excluding from the recirculated gas a significant portion of the gas liberated, namely, such gas from smaller bubbles as escapes the liquid more remotely from the gas-lift area than the areas segregated by said cover.

7. Apparatus for treating waste liquid with gas richer than air in oxygen which includes a retention tank, a source of substantially pure oxygen, means for releasing gas including gas from said source at submerged locations along selected zones of the tank, which comprise a small portion of its total horizontal cross section, at positions from which the gas can rise immediately by buoyancy with gas-lift action, to produce a rolling action of the tank contents with the gas-lifted contents immediately forming a horizontal stream having its surface exposed to release large bubbles while carrying small entrained bubbles to remote areas, characterized by:

a cover over said zones largely segregating areas where large bubbles escape the stream from more remote areas, selectively entrapping gas escaping the liquid in said areas of large-bubble escape, said apparatus being substantially free of impediment to the rolling action through the region of gas lifting and outward flow therefrom to beyond the area segregated by said cover, means for drawing off the entrapped gas for reuse while substantially excluding from it a significant portion of the gas liberated, namely, such gas from smaller bubbles as escapes the liquid more remotely from the gas-lift area than the areas segregated by said cover.

8. Apparatus for treating waste liquid with gas richer than air in oxygen which includes a retention tank, means for flowing liquid waste through said tank largely with successive passage through successive sections of the tank, a source for supplying substantially pure oxygen, means for releasing gas including gas from said source at submerged locations along selected zones of a plurality of the tank sections, said zones comprising only a small portion of the total horizontal cross section of each section, said means for releasing the gas releasing it at positions from which the gas can rise immediately by buoyancy with gas-lift action, and in sufficient quantities to create rolling action of the tank contents in the section with the gas-lifted contents immediately forming a horizontal stream having its surface exposed to release large bubbles while carrying small entrained bubbles to remote areas, characterized by:

a cover over said zones largely segregating areas where large bubbles escape the stream from more remote areas, selectively entrapping gas escaping the liquid in said areas of large-bubble escape, said apparatus being substantially free of impediment to the rolling action through the region of gas lifting and outward therefrom to beyond the area segregated by said cover, common means for drawing off the entrapped gas and recirculating and compressing said gas from various sections and means for enriching said gas by adding substantially pure oxygen from said source to it separately for each of a plurality of tank sections before it is released again in the same locations; said cover comprising means for substantially excluding from the recirculated gas a significant portion of the gas liberated, namely, such gas from smaller bubbles as escapes the liquid more remotely from the gas-lift area than said areas segregated by said cover; and means for regulating the addition of oxygen separately for each of a plurality of sections.

9. Apparatus for treating waste liquid with gas richer than air in oxygen which includes a retention tank, means for flowing liquid waste through said tank largely with successive passage through successive sections of the tank, means for releasing said gas at submerged locations along selected zones of a plurality of the tank sections, said zones comprising only a small portion of the total horizontal cross section of each section, said means for releasing the gas releasing it at positions from which the gas can rise immediately by buoyancy with gas-lift action, and in sufficient quantities to create rolling action of the tank contents in the section with the gas-lifted contents immediately forming a horizontal stream having its surface exposed to release large bubbles while carrying small entrained bubbles to remote areas, characterized by:

a cover over said zones largely segregating areas where large bubbles escape the stream from more remote areas, selectively entrapping gas escaping the liquid in said areas of large-bubble escape, said apparatus being substantially free of impediment to the rolling action through the region of gas lifting and outward therefrom to beyond the area segregated by said cover, common means for drawing off the entrapped gas and recirculating and compressing said gas from various sections and means for enriching said gas by adding substantially pure oxygen from said source to it separately for each of a plurality of tank sections before it is released again in the same locations; said cover comprising means for substantially excluding from the recirculated gas a significant portion of the gas liberated, namely, such gas from smaller bubbles as escapes the liquid more remotely from the gas-lift area than said areas segregated by said cover; and automatic means responsive to dissolved oxygen measurements in each of a plurality of sections for regulating the addition of oxygen for each section to maintain a predetermined level of dissolved oxygen.

10. The method of treating waste liquid with gas richer than air in oxygen which includes flowing the waste liquid through a retention tank, maintaining a gas-lift rolling action of the tank contents with the gas-lifted contents forming a horizontal stream flowing away from the gas-lift zone in surface exposed position by liberating and allowing to rise immediately by buoyancy said gas at depths at least of the order of ten feet at locations along selected zones of the tank comprising a small portion of its total horizontal cross section, in sufficient quantities to create and maintain said rolling action of the tank contents to carry small entrained bubbles to remote areas, characterized by:

selectively entrapping gas escaping the liquid in the area over said zones where relatively large gas-lift bubbles quickly escape the liquid forming said horizontal stream, and recirculating and enriching said gas by adding substantially pure oxygen to it, compressing it and liberating it again, in the same locations, while substantially excluding from the recirculated gas a significant portion of the gas liberated, namely, such gas from smaller bubbles as escapes the liquid at remote areas beyond the area of selective entrapment.

11. Apparatus for treating waste liquid with gas richer than air in oxygen content which includes a retention tank, means for liberating gas at depths at least of the order of ten feet, at locations along selected zones of the tank, which comprise a small portion of its total horizontal cross section, in sufficient quantities to create, by gas lifting, a rolling action of the tank contents to carry small entrained bubbles to remote areas, characterized by:

a cover over said zones constructed to comprise means largely segregating selected areas overlying said zones, and where large bubbles escape from more remote areas to which small entrained bubbles are carried by the rolling action, and selectively entrapping gas escaping the liquid in said selected areas; said apparatus being substantially free of impediment to the rolling action through the region of gas lifting and outward therefrom to beyond the area segregated by said cover, means connected to the space under said cover for recirculating and enriching said gas by adding substantially pure oxygen to it, including means for compressing it and liberating it again through said means for liberating gas, said cover and recirculating means substantially excluding from the gas recirculated thereby a significant portion of the gas liberated, namely, such gas from smaller bubbles as escapes the liquid more remotely from gas-lifting areas than the areas segregated by said cover.

* * * * *